United States Patent
Pramod et al.

(10) Patent No.: US 10,773,748 B2
(45) Date of Patent: Sep. 15, 2020

(54) COMPENSATOR ANTI-WINDUP FOR MOTION CONTROL SYSTEMS

(71) Applicant: STEERING SOLUTIONS IP HOLDING CORPORATION, Saginaw, MI (US)

(72) Inventors: Prerit Pramod, Saginaw, MI (US); Zhe Zhang, Saginaw, MI (US); Rakesh Mitra, Saginaw, MI (US); Rangarajan Ramanujam, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 3 days.

(21) Appl. No.: 15/982,228

(22) Filed: May 17, 2018

(65) Prior Publication Data

US 2019/0351939 A1 Nov. 21, 2019

(51) Int. Cl.
*B62D 5/04* (2006.01)
*H02K 21/02* (2006.01)
*H02P 29/40* (2016.01)

(52) U.S. Cl.
CPC ......... *B62D 5/0463* (2013.01); *B62D 5/0409* (2013.01); *B62D 5/0454* (2013.01); *H02K 21/02* (2013.01); *H02P 29/40* (2016.02)

(58) Field of Classification Search
None
See application file for complete search history.

(56) References Cited

U.S. PATENT DOCUMENTS

| | | | | |
|---|---|---|---|---|
| 2003/0019685 A1* | 1/2003 | Graber | ................... | B62D 5/003 180/402 |
| 2008/0147276 A1* | 6/2008 | Pattok | .................. | B62D 5/0472 701/42 |
| 2012/0265403 A1* | 10/2012 | Svensson | ........... | B60K 31/0008 701/41 |
| 2016/0303485 A1* | 10/2016 | Kawamura | .......... | G05D 1/0011 |
| 2017/0288598 A1* | 10/2017 | Cheng | ..................... | H02P 29/10 |
| 2020/0039577 A1* | 2/2020 | Kataoka | ................. | B62D 6/008 |

OTHER PUBLICATIONS

Tae-Suk Kwon, and Seung-Ki Sul,: Novel Antiwindup of a Current Regulator of a Surface-Mounted Permanent-Magnet Motor for Flux-Weakening Control; IEEE Transactions on Industry Applications, vol. 42, No. 5, Sep./Oct. 2006 (Year: 2006).*
Jong-Woo Choi, and Sang-Cheol Lee: Antiwindup Strategy for PI-Type Speed Controller; IEEE Transactions on Industrial Electronics, vol. 56, No. 6, Jun. 2009 (Year: 2009).*

* cited by examiner

*Primary Examiner* — Abdhesh K Jha
(74) *Attorney, Agent, or Firm* — Dickinson Wright PLLC

(57) ABSTRACT

One or more embodiments are described for preventing controller windup in a motion control system. An example system includes a regulator that receives an input command to adjust a motion control variable of a mechanical system that includes a motor, the regulator configured to generate a first torque command based on the input command and an output torque from the motor. The system further includes a motor control module that receives the first torque command to generate an input torque command that is sent to the motor. The system further includes an anti-windup module that is configured to generate an anti-windup command based on the first torque command and the output torque, the anti-windup command being added to the input command that is sent to the regulator.

20 Claims, 7 Drawing Sheets

COMPENSATOR ANTI-WINDUP FOR MOTION CONTROL SYSTEMS

BACKGROUND

The present application generally relates to motion control systems, and particularly to preventing windup in motion control systems, and more particularly to those used in systems like electric power steering (EPS) systems where closed-loop compensators are used for motion control of electric drive systems.

Typically, motion control systems employ electric actuators, which are control systems utilizing electrical machines and complementary power electronic modules controlled via digital signal processors for determining the compensation logic and driving the hardware circuitry. The hardware in such control systems have physical limitations, which is considered in the control system design in order to obtain optimal performance.

Motion control systems utilizing electrical actuators are implemented typically through a dual cascaded control structure, with the inner loop for controlling the currents and an outer loop for controlling the electromagnetic torque. The torque command is used to compute current commands considering multiple constraints depending on the machine and application under consideration.

Various motion control systems use a tracking compensator such as an integrator for accurate closed loop tracking. Examples of such systems include servomechanism for maintaining machine speed, closed loop handwheel torque in Electric Power Steering (EPS) systems, and handwheel position regulation schemes in Advanced Driver Assistance Systems (ADAS). Due to the limitations on the torque command and the actual torque, the control signal (torque) requested by the integrator may not be applied to the system. This discrepancy results in controller windup which degrades system performance and can lead to instabilities.

SUMMARY

One or more embodiments are described for preventing controller windup in a motion control system. An example system includes a regulator that receives an input command to adjust a motion control variable of a mechanical system that includes a motor, the regulator configured to generate a first torque command based on the input command and an output torque sent to the motor. The system further includes a motor control module that receives the first torque command to generate a torque command that is sent to the motor to generate an output torque. The system further includes an anti-windup module that is configured to generate an anti-windup command based on the first torque command and the output torque, the anti-windup command being added to the input command that is sent to the regulator.

According to one or more embodiments, a method for preventing controller windup in an electric motor includes generating, by a regulator, a first torque command for sending to the electric motor, the first torque command generated based on a received input command to regulate a motion control variable. The method further includes limiting, by a motor control system, the first torque that is sent to the electric motor, which generates an output torque. The method further includes determining, by an anti-windup block, an anti-windup command based on the first torque command and the output torque. The method further includes adjusting, by the anti-windup block, the received input command of the regulator using the anti-windup command.

According to one or more embodiments, a system for preventing controller windup in a motion control system that uses a motor includes a regulator that computes a first torque command ($T_b^*$) based on a received input command to regulate a motion control variable, the regulator configured to compute the first torque command based on a disturbance feedforward, a reference feedforward, a state feedback, and an integrator output. The system further includes a limiting module that determines a limited torque command based on the first torque command ($T_b^*$), the limited torque command being used to generate an output torque from the motor. The system further includes an anti-windup module that receives values of the first torque command and the output torque, the anti-windup module generates an anti-windup command for adjusting the received input command provided to the regulator.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

It should be noted that the various technical features described herein facilitate improvements to motor control systems. The description herein uses an electric power steering system as an example that uses a motor control system, which is improved using and/or implementing the various technical features described herein. However, the technical solutions described herein are not limited to an electric power steering, rather are applicable in motor control systems used in any other system, such as an industrial motor, a biomechanical device, an automated drive assist system, or any other electric machine that uses a motor control system.

It is desirable to use anti-windup techniques to improve performance of a motor control system, and in turn the performance of a system that is using the motor control system, to prevent degradation caused by the windup.

Figure 1:
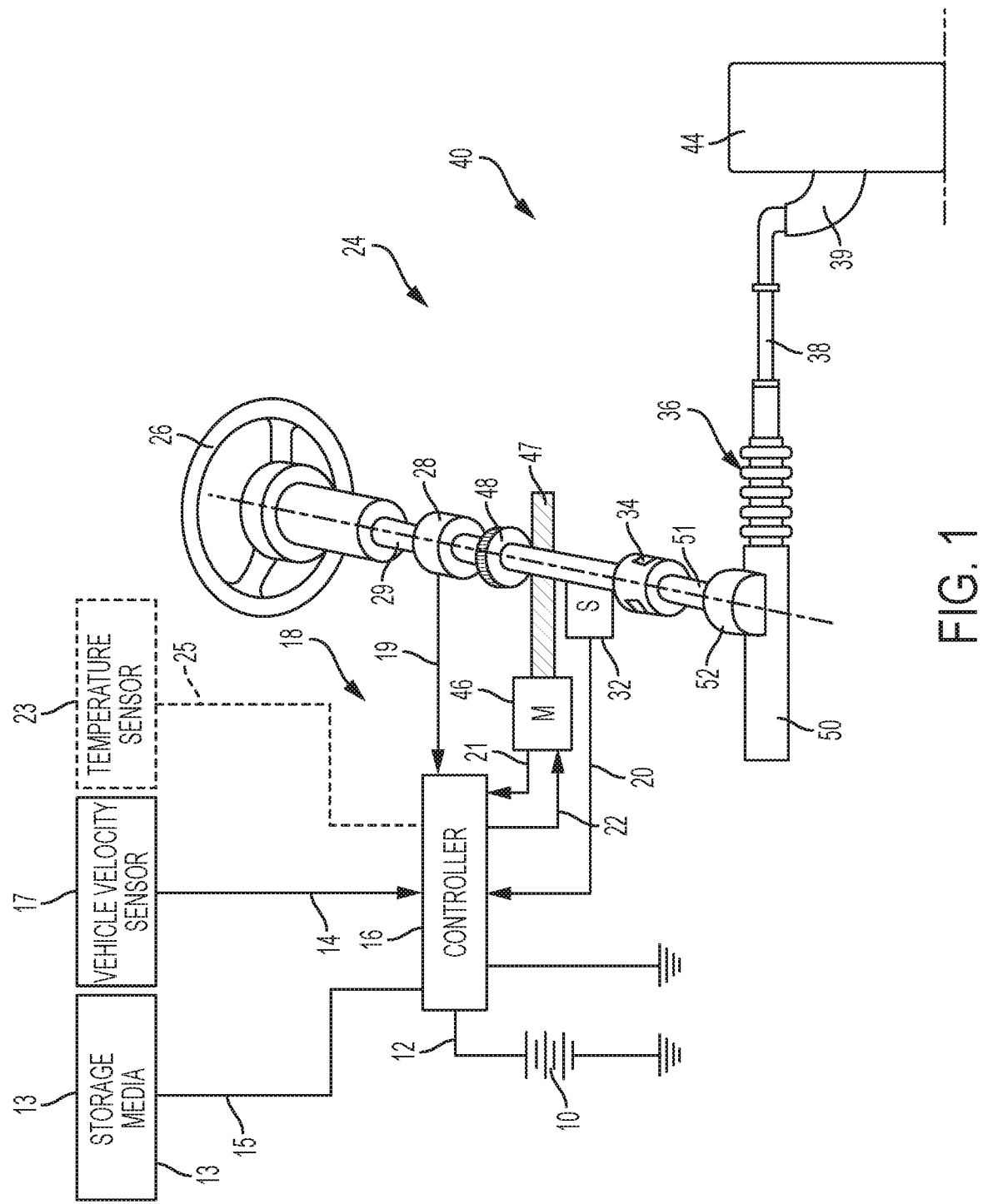
FIG. 1 is an exemplary embodiment of an electric power steering system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 19, which could be a permanent magnet synchronous motor, and is hereinafter denoted as motor 19. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m=\Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 19, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 19. Controller 16 is configured to develop the corresponding voltage(s) out of inverter (not shown), which may optionally be incorporated with controller 16 and will be referred to herein as controller 16, such that, when applied to the motor 19, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 19 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 19.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 19. Preferably, the temperature sensor 23 is configured to directly measure the temperature of the sensing portion of the motor 19. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Figure 2:
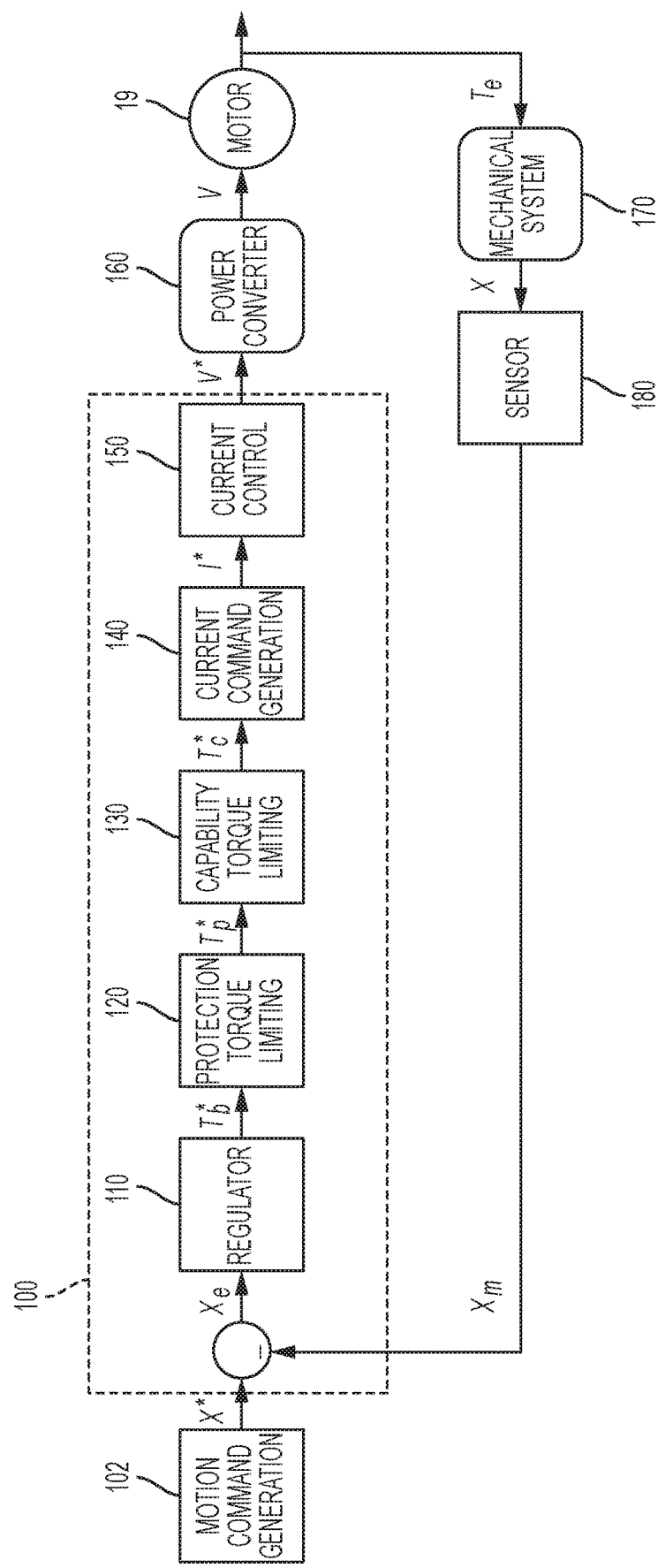
FIG. 2 is an exemplary schematic illustration of a block diagram of a motion control system according to one or more embodiments.

FIG. 2 depicts a block diagram of a motion control system according to one or more embodiments. The motion control system 100 may be part of the steering system 40, or any other machine that uses a motor to cause displacement, generation of torque, and the like. The motion control system 100 regulates a state variable X of the mechanical system such as position, speed, handwheel torque etc. It should be noted that in one or more examples, a motion control system includes a motor control (electric drive) system. As used herein, a 'motion control' represents the control of a mechanical variable in a general system with any mechanical dynamics, and a 'motor control' represents the control of the electrical dynamics of a motor, but not the mechanical dynamics of the motor, unless expressly stated otherwise. The technical solutions described herein are, thus, not solely regarding an anti-windup for motor control systems, which typically provide current control anti-windup; rather, the technical solutions described herein facilitate an anti-windup for a motion control system (the motor control system being a part of such a motion control system, along with other components).

The motion control system 100 includes a regulator 110, which is a compensator (static or dynamic) that ensures that the measured state variable $X_m$ becomes equal to the commanded value $X^*$. The commanded value can be received from a command generator 102, which may be an ADAS, a human, or any other controller that is requests a particular motion from the mechanical system, particularly the motor 26.

While the regulator designs can vary widely, tracking control is usually performed using integrator(s). The output of the regulator 110 is the (pre-limited) motor torque command $T_b^*$, which is then sent to a protection torque limiting module 120 that may implement one or more limiting algorithms. Algorithms may include those for protecting the machine from excessive heating such as thermal duty cycle, end of travel thermal limiting etc, or end-stop algorithms in EPS systems are grouped together and shown in the protection torque limiting module 120. Once the torque has been limited by these algorithms, the protection limited torque command $T_p^*$ is further sent to the capability torque limiting module 130.

The capability torque limiting module 130 limits the torque command further in order to satisfy the fundamental capability of the electric actuator, which includes inverter and motor 19. The output of the capability torque limiting module 130 is capability limited torque command $T_c^*$. The inverter limit is defined by the maximum currents that the individual switches can carry without getting damaged, and the machine limit is basically the maximum torque capability of the electric machine at a given operating speed and supply voltage based on the impedance of the machine.

The capability limited torque command T is then forwarded to a current command generation module 140, which converts the $T_c^*$ to equivalent current commands(s) I* using algorithms such as maximum torque per ampere (MTPA) and maximum torque per voltage (MTPV). The current commands I* are then sent to a current controller 150, which may be a feedback compensator such as PI type, or a feedforward controller that computes the control signals (voltages) utilizing an inverse model of the machine (with estimated parameters).

The current controller 150 generates voltage commands V*, which are then supplied to the motor 19 via a power converter 160. Due to time delays in the voltage application as well as power converter nonlinearities, the actual voltages V applied to the machine 19 may be different from the voltage commands V*. Note that this description applies to electric drive systems with both AC machines (e.g., PMSM) as well as DC machines (e.g., PMDC). The electric machine 19 then produces the electromagnetic torque $T_e$, which gets applied on the mechanical system 170 that produces the desired motion.

In one or more examples, the motion command generation block 102 determines the command value for the state variable (X) being regulated. For instance, this may be the speed command of the motor 19 in an electric water pump application. Thus, even though not explicitly shown in the figure, it should be understood that the motion command generation block 102 may receive other (sensed) inputs from the mechanical or electrical system 170 and may determine the command value (X*) based on those.

The regulator structure can vary widely, but typically, the regulator 110 ensures a steady-state command tracking using an integrator. Additional control elements such as proportional, derivative controllers or state feedback compensators may also be employed for overall motion control dynamic performance enhancements. However, an integrator when used as the regulator 110 is most prone to the phenomena of controller windup, which can result in degraded performance and even instability of the closed-loop system. The entire torque path that includes the blocks between $T_b^*$ and actual electromagnetic torque $T_e$ acts as an effective saturation block due to the different limiting blocks. Whenever the regulator output gets clamped or limited by this saturation block, the states of the regulator (integrator) 110 are updated incorrectly and the state variable (X) starts winding up if no counter-action is taken. Depending on the duration of the windup and the post-windup condition, the controller 26 might take long periods to be unsaturated and return to error-free operation.

Note that the windup condition may be caused by multiple reasons, including command set-point changes or system load variations. Further, the command saturation may occur in a transient or steady state manner. A transient saturation condition implies that the compensator output exhibits dynamics which result in a control signal output that exceeds the limits for a short duration, while steady state saturation implies that the control signal is saturated when the control system settles to its steady state.

Figure 3:
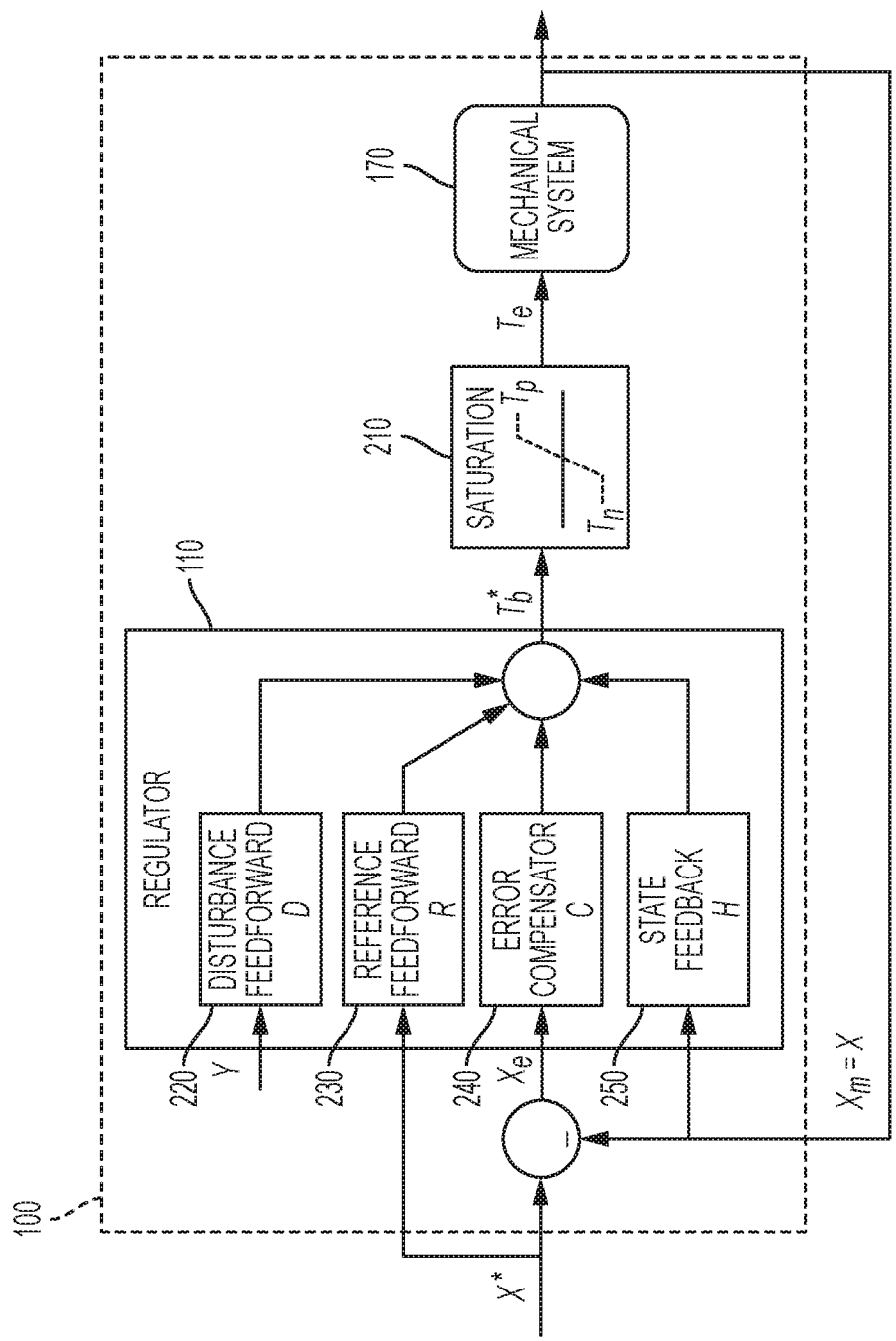
FIG. 3 depicts a regulator according to one or more embodiments.

FIG. 3 depicts a regulator 110 according to one or more embodiments. In FIG. 3 the mechanical system 170 is depicted along with a saturation block 210 that combines the one or more limiting blocks from FIG. 2 herein. The regulator 110 generates the control signal $T_b^*$ as a summation of multiple blocks, namely disturbance feedforward D 220, reference feedforward R 230, error compensator C 240, and state feedback H 250. Thus, the control signal may be expressed as follows.

$$T_b^* = DY + RX^* + HX + C(X^* - X)$$

The signal Y represents any signals required to estimate or compute the disturbance terms. While it is possible to select each of the different regulator blocks, typically an integrator is used in the error compensator 240. Any other compensator types such as proportional typically do not have any dynamic terms and can therefore be included within the other regulator blocks. The control signal may be re-written as follows.

$$T_b^* = DY + (R + C_0)X^* + (H - C_0)X + \frac{C_1}{s}(X^* - X)$$

In this representation, the equivalent reference feedforward and state feedback compensators are $R+C_0$ and $H-C_0$ respectively. The control signal saturation can be mathematically represented as follows.

$$T_e = \begin{cases} T_n, & T_b^* < T_n \\ T_b^*, & T_n \leq T_b^* < T_p \\ T_p, & T_b^* \geq T_p \end{cases}$$

It should be noted that one of the embodiments of the technical solutions described herein is illustrated for the anti-windup for the case where the regulator has only an integrator compensator with dynamic elements, while all the other elements have only static terms. It should be understood however that in other examples the compensators with other dynamic elements may be used.

Figure 4A:
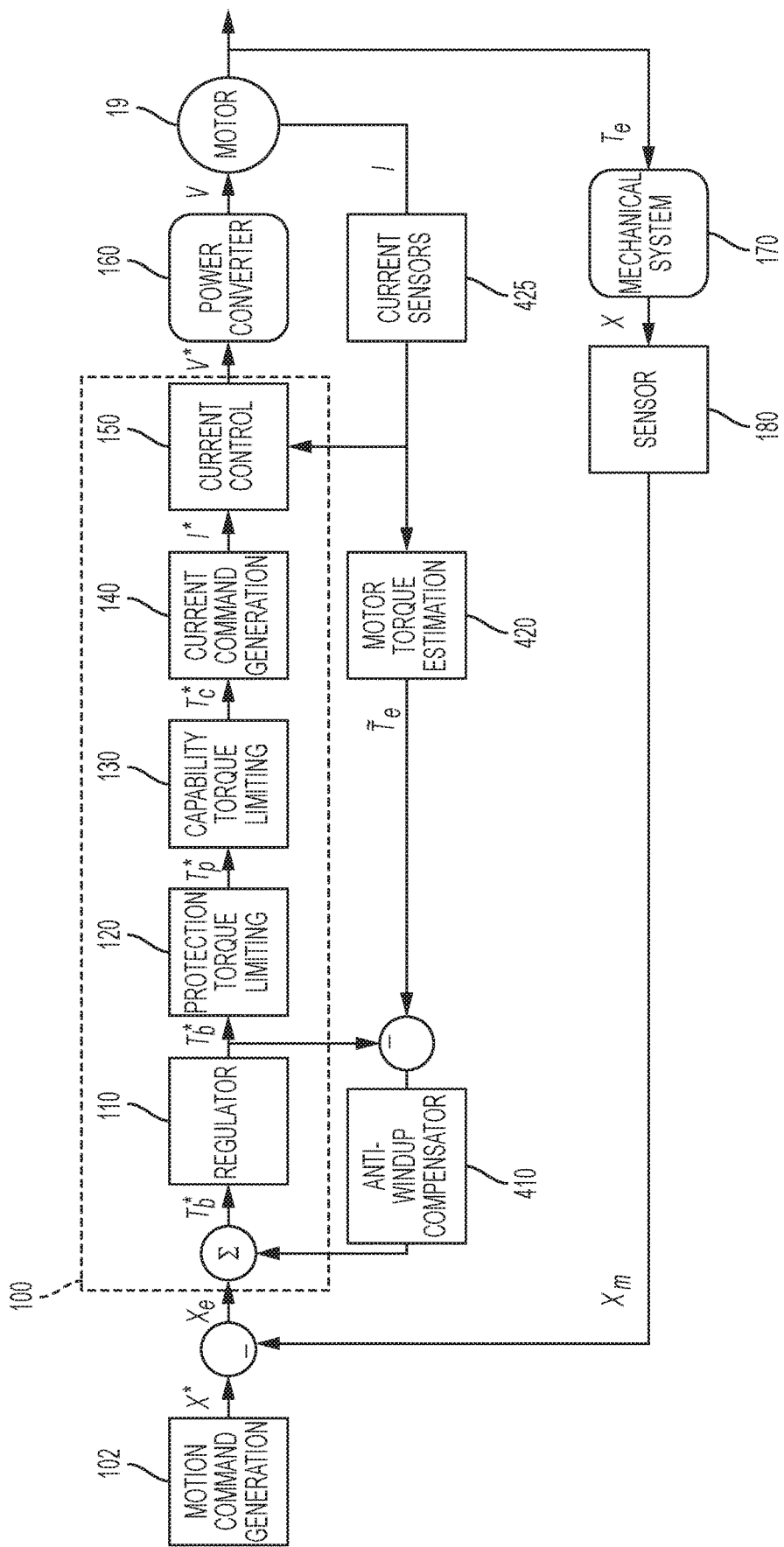
FIG. 4A is an exemplary schematic illustration of a block diagram of a motion control system with an anti-windup compensator according to one or more embodiments.

FIG. 4A depicts a block diagram of a motion control system with compensator anti-windup according to one or more embodiments. The motion control system (FIG. 2) is coupled with an anti-windup compensator 410 that uses an output torque from the motor 19 to modify an input to the motion control system 100 to effect anti-windup by ensuring that the regulator output does not saturate. In one or more examples, the output torque ($T_e$) of the motor 19 is measured by a torque sensor (not shown), and the measured value is input to the anti-windup compensator 410. Alternatively, or in addition, the output torque of the motor 19 that is used by the anti-windup compensator 410 is an estimated output torque ($\tilde{T}_e$) that is computed by a motor torque estimation module 420 using measured output current of the motor 19 from one or more current sensors 425. Estimating motor output torque ($\tilde{T}_e$) can be performed using any known technique.

Accordingly, in one or more examples, the anti-windup compensator 410 uses the input torque command, and the actual electromagnetic torque i.e. motor output torque ($T_e$) to generate the anti-windup command. Alternatively, if the actual motor output torque ($T_e$) cannot be measured, an estimate ($\tilde{T}_e$) of the motor output torque is used in its place. For instance, in the case of a motion control system that includes a motor control system 100, which operates in feedback current control mode, and thus has motor current sensors 425, the motor output torque (which is not the same as $T_c^*$ in FIG. 2) can be estimated from the measured currents. The anti-windup command is then be based on this motor output torque estimate ($\tilde{T}_e$) and the input torque command.

Further, in another example, where current sensors 425 may not available for output torque estimation, the anti-windup module 410 uses the final torque command (which is $T_c^*$ in FIG. 2) (instead of the actual/estimated output torque) to compute the anti-windup command.

Figure 4B:
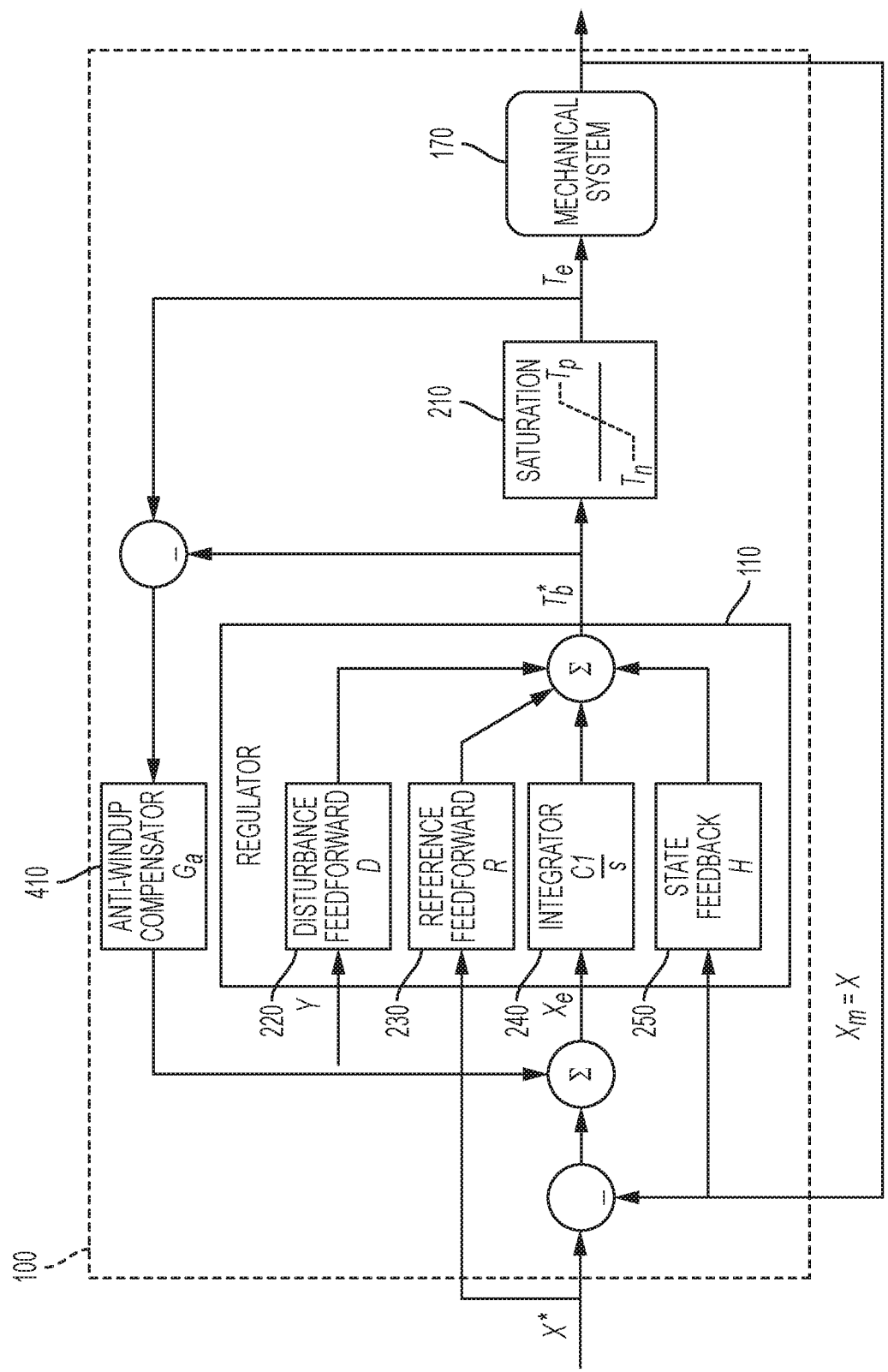
FIG. 4B depicts a block diagram of an anti-windup scheme according to one or more embodiments.

FIG. 4B depicts a block diagram of an anti-windup scheme according to one or more embodiments. The motion control system 100 includes an anti-windup compensator $G_a$ 410. To describe the anti-windup operation consider a new signal named achievable command $X_a^*$. This achievable command is the command that ensures the regulator output does not saturate. Thus, with this command, the saturation block is effectively eliminated and the control signal may be written as follows.

$$T_e = DY + RX_a^* + HX + \frac{C_I}{s}(X_a^* - X)$$

Accordingly, the pre-limited control signal for the regulator 110 per FIG. 4 may be written as follows.

$$T_b^* = DY + RX^* + HX + \frac{C_I}{s}(X^* - X + G_a(T_e - T_b^*))$$

Subtracting the above two equations, obtain the following simplified relationship is obtained.

$$X_a^* - X^* = G_x(T_e - T_b^*)$$

$$G_x = \left(R + \frac{C_I}{s}\right)^{-1}\left(\frac{C_I}{s}G_a + 1\right)$$

For a general multi-input multi-output system, the '1' in the above equation can be replaced with an identity matrix (I). The equation uses a scalar '1' for a single-input single-output systems, like the one described herein.

The transfer function $G_x$ represents the dynamics of the control system 100 when the regulator 110 exits the saturation condition. Hence, if the anti-windup compensator 410 uses a transfer function $G_a$ such that $G_x$ becomes a static term, the windup can be prevented. It should be noted that a static $G_x$ implies that when the saturation condition goes away, the control system 100 returns to linear operation instantaneously. Here, the achievable command ($X_a^*$) during saturation is a fixed value for a single-input single-output system. It may be calculated in terms of the plant output and control signal by removing the limiter and assuming that the control signal is fixed at the value of saturation limits. Once the linear compensator has been designed to achieve a certain performance, the compensation terms R and $C_I$ are already fixed. Therefore, selecting $G_a$ in order to ensure that $G_x$ becomes a static gain, although ideal, is not practically possible. Such a technical challenge is addressed by the technical solutions described herein by having the anti-windup compensator $G_a$ such that for the expected frequencies of operation of the control system 100, the transfer function $G_x$ is effectively (substantially) static. For instance, consider the case of a pure integral compensator. Thus, R is zero in this case, and the transfer function $G_x$ may be written as follows.

$$G_x = G_a + \frac{s}{C_I}$$

If the maximum operational frequency of the system is $f_m$ Hz, then value of $G_a$ is set such that $$G_a \gg \frac{2\pi f m}{C_I}.$$

This selection of $G_a$ ensures that $G_x$ is substantially static within the operational frequency range of the control system.

As mentioned earlier, this approach of the anti-windup compensator selection and tuning to systems with other dynamic compensation terms such as derivatives etc. can be further extended. It should also be understood that the transfer function $G_a$ for the anti-windup module 410 does not need to be a static term and may be chosen to have dynamic elements itself.

Further, it should be noted that in one or more examples, direct measurement of the electromagnetic torque output ($T_e$) is not available in motor control systems. In such cases, the technical solutions described herein address such technical challenges by estimating the electromagnetic torque $T_e$ using motor current measurements along with estimated machine parameters. The current measurements are received from one or more current sensors. For instance, the electromagnetic torque of a PMDC machine may be written in terms of the estimated back-EMF constant $\tilde{K}_e$ and measured motor current $I_m$ as follows.

$$T_e = \tilde{K}_e I_m$$

Similarly, the electromagnetic torque output for a PMSM machine may be written in terms of the estimated motor back-EMF constant $\tilde{K}_e$, machine d/q axis inductance $\tilde{L}_d$ and $\tilde{L}_q$, number of poles $N_p$ and measured currents $I_{dm}$ and $I_{qm}$ as follows.

$$T_e = \frac{3}{2}\tilde{K}_e I_{qm} + \frac{3}{8}N_p(\tilde{L}_q - \tilde{L}_d)I_{dm}I_{qm}$$

Note that this torque estimation is only possible in systems where the measured currents are available. However, a technical challenge exists if the current measurements are not available, for example due to absence from the hardware layout or a fault condition with the current sensors, etc. In this case, the motion control system 100 may include a motor control system that uses feedforward control technique for current control. To address this technical challenge, the technical solutions described herein, instead of using the estimated torque as the final limited output, use the final capability limited torque command $T_c^*$. The technical solutions described herein can use the capability limited torque command $T_c^*$ if the dynamics of the current control system 100 (electrical system) is much faster than the dynamics of the mechanical control system 170, and if the steady state torque tracking performance of the feedforward controller is substantially ideal. Most electric drive motion control systems satisfy these conditions.

It should be noted that while one specific type of anti-windup technique is described in detail here, other anti-windup techniques for single-input-single-output systems such as Condition Integration, Incremental Algorithm etc. may also be used instead. The technical solutions described herein thus provide anti-windup for motor control systems in motion control systems by including an anti-windup block (which may be realized through multiple embodiments) to ensure that performance of the motor control system during torque command saturation in motion control systems 100 involving electric machine based drive systems does not deteriorate because of saturation caused by windup.

Figure 5:
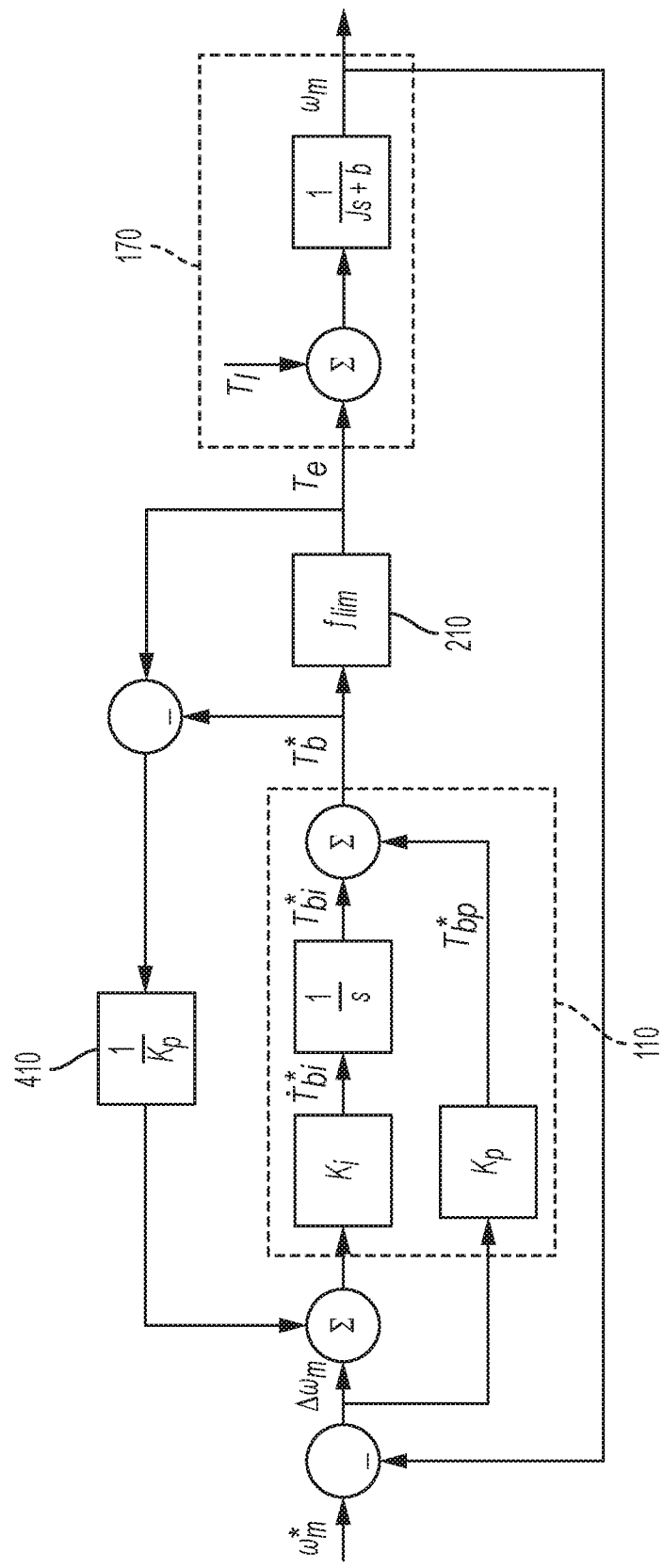
FIG. 5 depicts a block diagram of a motion control system according to one or more embodiments.

FIG. 5 depicts a block diagram of a motion control system according to one or more embodiments. In order to illustrate the effectiveness of the proposed techniques, consider a speed control system utilizing a PMSM in which the speed regulation is done utilizing a PI compensator without any disturbance feedforward; i.e. here the mechanical parameter X that is being controlled is the motor speed $\omega_m$. According to the technical solutions described herein, the transfer function $G_x$ is expressed as follows.

$$G_x = \left(K_p + \frac{K_i}{s}\right)^{-1}\left(1 + \frac{K_i}{s}G_a\right)$$

Here, the anti-windup compensator 410 is selected as $$G_a = \frac{1}{K_p}$$

and results in $$G_x = \frac{1}{K_p}.$$

In case a different controller is chosen instead of a PI, the anti-windup compensator gain may be selected by following the process described herein.

Figure 6:
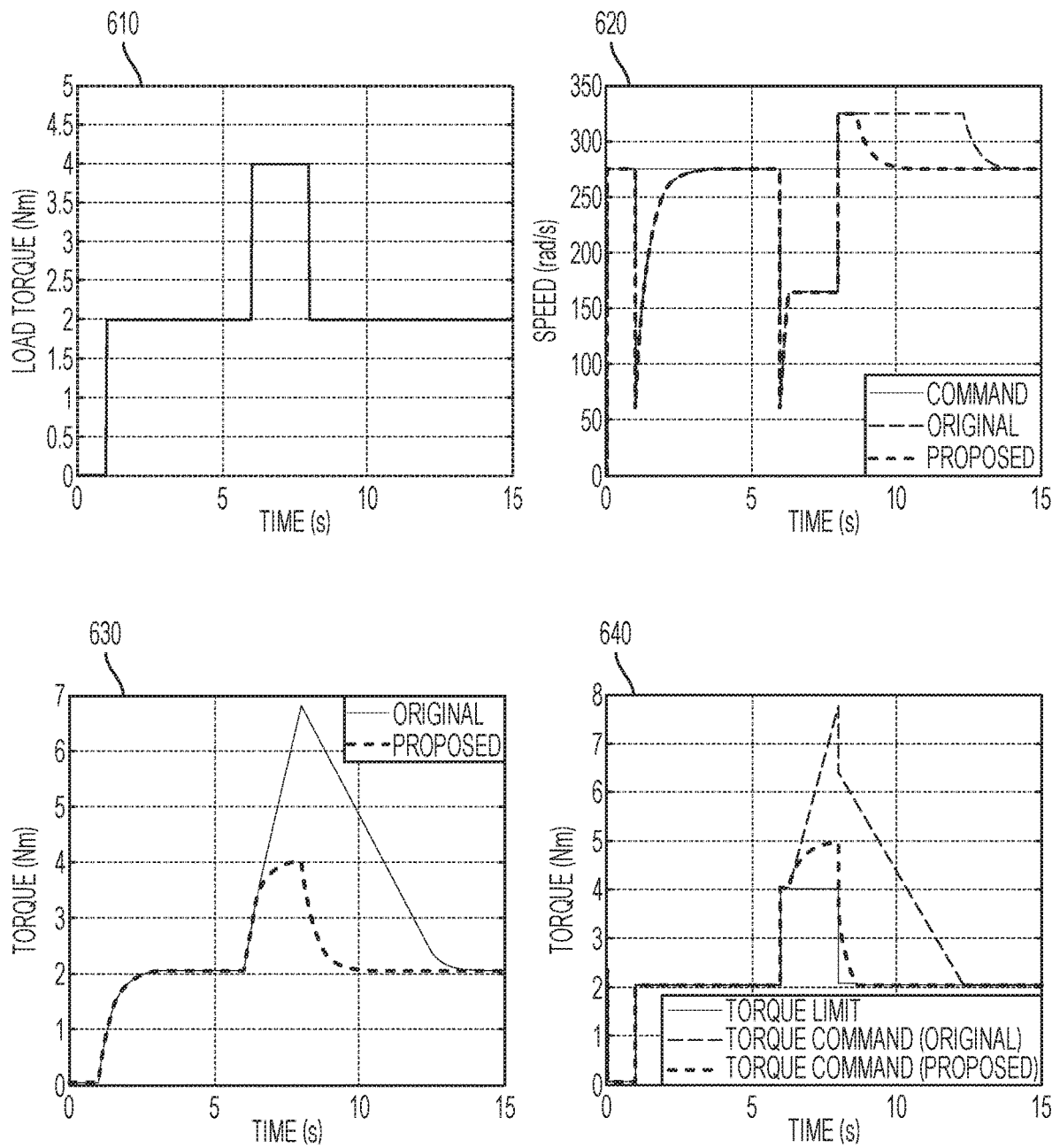
FIG. 6 depicts example results using one or more embodiments described herein.

Simulation results illustrating the effectiveness of the anti-windup 410 in the speed control system 100 of FIG. 5 are shown in the plots of FIG. 6. In the simulation, the saturation is achieved by changing the set-point as well as changing disturbance, which in the case of a speed control system are the speed command and load torque respectively (change in load torque shown in plot 610). In the results, when the load torque changes suddenly, the actual speed is no longer able to follow the command, as seen in plot 620. While the actual speed settles to a final value in steady state, the integrator keeps winding up due to the non-zero error value in the original scheme (see plot 630). With the anti-windup block 410 in place, the integrator output is limited as desired (plot 630). Further, the return to linear operation when the load torque changes back to original (unsaturated) value is gradual with a pre-defined response shape (as seen in plot 640). It should be noted that the results depicted herein are for a specific case and that in other situations, the results may vary.

Accordingly, the technical solutions described herein facilitate a motion control system to provide anti-windup scheme to avoid performance degradation due to torque command saturation in a motor control system, the anti-windup providing in consistent desired performance under all saturation conditions (saturated/unsaturated).

It should be noted that although the embodiment above describes an example of a motion control system that uses a motor control system that is controlling a speed of the mechanical system, the technical solutions described herein is not limited only to such systems; rather the technical solutions described herein can be used in any other motion control system, such as for handwheel torque regulation in an EPS handwheel torque, steer by wire handwheel actuator, for position servo in a steer by wire road-wheel actuator, or a quadrasteer system, and the like.

As described herein, the technical solutions herein address the technical challenge in such motion control systems where limiting of the (torque) commands of the outer loop compensators with integrators causes controller windup condition(s). The torque limiting of the outer loop compensators may include techniques generally used such as system protection limiting algorithms, and/or machine, actuator and system capability limitations. Such controller windup condition(s) cause performance degradation and (potentially) instability in the motion control system. Typically, to avoid such controller windup, separate anti-windup algorithms and corresponding tuning techniques for different applications with various electric drives and loop structures are required, which is difficult.

The technical solutions described herein provide universally applicable anti-windup schemes for different motion control systems. The technical solutions described herein facilitate a universally applicable anti-windup by using analytical design and tuning techniques that provide saturation transfer matrices based on dynamics of the motion control system during saturation condition(s). Further, the technical solutions herein use control signal estimation, which can be provided for different motor designs such as PMSM, PMDC etc. and also in faulted mode operation.

The technical solutions accordingly use saturation dynamics that provide substantially instantaneous response in a controller windup situation. Further, the anti-windup transfer matrix is independent of motor control dynamics enabling the anti-windup to be universal. Further, by being able to use the appropriate torque commands as inputs, the technical solutions can be used even in case of sensor errors or even failures.

The technical solutions described herein provide an improvement to motor control systems, and thereby motion control systems using the motor control systems, by providing an anti-windup control scheme implementation considering multiple components and operating conditions of the machine. The anti-windup scheme provided by the technical solutions herein is universally applicable as the technical solutions described herein are independent of motor design variations, fault tolerant operation modes, and compensator structures (can work even without integrators).

While one or more embodiments of the invention have been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A system for preventing controller windup in a motion control system, the system comprising:
a processor; and
a memory that stores instructions that, when executed by the processor, cause the processor to:
receive an input command;
adjust a motion control variable of a mechanical system that includes a motor;
generate a first torque command based on the input command and an output torque generated by the motor; and
generate an anti-windup command based on the first torque command and the output torque, the anti-windup command being added to the input command.

2. The system of claim 1, wherein the output torque is an estimated output torque, the estimation based on one or more current sensors.

3. The system of claim 1, wherein the output torque is an input torque command sent to the motor.

4. The system of claim 1, wherein the motor is a permanent magnet DC (PMDC) motor.

5. The system of claim 1, wherein the motor is a permanent magnet synchronous motor (PMSM).

6. The system of claim 1, wherein the motion control variable is a handwheel position of a steering system.

7. The system of claim 1, wherein the motion control system operates a road-wheel actuator of a steering system, and the motion control variable is a road-wheel actuator position.

8. The system of claim 1, wherein the motion control system operates a hand-wheel actuator of a steering system, and the motion control variable is a handwheel torque.

9. A method for preventing controller windup in an electric motor, the method comprising:
generating, by a regulator, a first torque command for sending to the electric motor, the first torque command generated based on a received input command to regulate a motion control variable;
limiting, by a motor control system, the first torque command;
determining, by an anti-windup block, an anti-windup command based on the first torque command and an output torque from the electric motor; and
adjusting, by the anti-windup block, the received input command of the regulator using the anti-windup command.

10. The method of claim 9, wherein the output torque is an input torque command sent to the electric motor.

11. The method of claim 9, wherein the electric motor is a permanent magnet DC (PMDC) motor.

12. The method of claim 11, wherein the output torque is an estimated torque that is estimated as $T_e = \tilde{K}_e I_m$, where $\tilde{K}_e$ is a back-electromotive force constant and $I_m$ is a measured electric motor current.

13. The method of claim 9, wherein the electric motor is a permanent magnet synchronous motor (PMSM).

14. The method of claim 13, wherein the output torque is an estimated torque that is estimated as $$T_e = \frac{3}{2}\tilde{K}_e I_{qm} + \frac{3}{8}N_p(\tilde{L}_q - \tilde{L}_d)I_{dm}I_{qm},$$

where $\tilde{K}_e$ is a back-electromotive force constant and $I_{dm}$ and $I_{qm}$ are measured electric motor currents in d-axis and q-axis respectively, $L_d$ and $L_q$ are inductances in the d-axis and the q-axis respectively, and $N_p$ is a number of poles.

15. A system for preventing controller windup in a motion control system that uses a motor, the system comprising:
a processor that executes one or more programs stored on a memory to:
compute a first torque command ($T_b^*$) based on a received input command to regulate a motion control variable;
compute the first torque command based on a disturbance feedforward, a reference feedforward, a state feedback, and an integrator output;
determine a limited torque command based on the first torque command ($T_b^*$), the limited torque command being used to generate an output torque from the motor;
receive a value of the first torque command and a value of the output torque; and
generate an anti-windup command for adjusting the received input command.

16. The system of claim 15, wherein the value of the output torque is an input torque command sent to the motor.

17. The system of claim 15, wherein the motor is a permanent magnet DC (PMDC) motor, and wherein the value of the output torque is an estimated value that is estimated as $T_e = \tilde{K}_e I_m$, where $\tilde{K}_e$ is a back-electromotive force constant and $I_m$ is a measured electric motor current.

18. The system of claim 15, wherein the electric motor is a permanent magnet synchronous motor (PMSM), and wherein the value of the output torque is an estimated value that is estimated as $$T_e = \frac{3}{2}\tilde{K}_e I_{qm} + \frac{3}{8}N_p(\tilde{L}_q - \tilde{L}_d)I_{dm}I_{qm},$$

where $\tilde{K}_e$ is a back-electromotive force constant and $I_{dm}$ and $I_{qm}$ are measured electric motor currents in d-axis and q-axis respectively, $L_d$ and $L_q$ are inductances in the d-axis and the q-axis respectively, and Np is a number of poles.

19. The system of claim 15, wherein the motor control system operates a road-wheel actuator of a steering system, and the motion control variable is a road-wheel actuator position.

20. The system of claim 15, wherein the motor control system operates a hand-wheel actuator of a steering system, and the motion control variable is a handwheel torque.

* * * * *